US008270900B2

(12) United States Patent
Parkman et al.

(10) Patent No.: US 8,270,900 B2
(45) Date of Patent: Sep. 18, 2012

(54) AGGREGATE BATCH POLLING METHOD FOR RETURN LINK COMMUNICATIONS BETWEEN A PLATFORM AND A BASE STATION

(75) Inventors: David S. Parkman, Mercer Island, WA (US); Christopher J. McLain, Palo Alto, CA (US); Paulus J. Martens, Seattle, WA (US); Janet L. King, Redmond, WA (US)

(73) Assignee: The Boeing Company, Chicago, IL (US)

( * ) Notice: Subject to any disclaimer, the term of this patent is extended or adjusted under 35 U.S.C. 154(b) by 1375 days.

(21) Appl. No.: 11/420,675

(22) Filed: May 26, 2006

(65) Prior Publication Data

US 2007/0275659 A1 Nov. 29, 2007

(51) Int. Cl.
*H04B 7/185* (2006.01)

(52) U.S. Cl. ...... 455/13.4; 455/13.2; 455/429; 455/447; 455/452.1

(58) Field of Classification Search ............... 455/452.1, 455/13.2, 13.4, 429, 447
See application file for complete search history.

(56) References Cited

U.S. PATENT DOCUMENTS

| | | | | |
|---|---|---|---|---|
| 5,991,279 | A * | 11/1999 | Haugli et al. | 370/311 |
| 6,754,500 | B1 * | 6/2004 | He | 455/452.1 |
| 6,760,847 | B1 * | 7/2004 | Liu et al. | 713/300 |
| 6,975,616 | B2 | 12/2005 | Stephenson et al. | |
| 2002/0058477 | A1 * | 5/2002 | Chapelle | 455/13.4 |
| 2002/0058478 | A1 | 5/2002 | de La Chapelle et al. | |
| 2002/0167917 | A1 * | 11/2002 | Stephenson et al. | 370/319 |
| 2003/0043761 | A1 * | 3/2003 | Hladik | 370/319 |
| 2006/0111041 | A1 * | 5/2006 | Karabinis | 455/13.4 |

* cited by examiner

*Primary Examiner* — Patrick Edouard
*Assistant Examiner* — Shantell L Heiber
(74) *Attorney, Agent, or Firm* — Caven & Aghevli LLC

(57) ABSTRACT

Implementations are described that use a control center to maintain a list of registered mobile platforms that are pre-authorized to make use of the satellite-based transponder to transmit and receive data content to and from the base transceiver. The control center may cause the base transceiver to transmit at least one polling message, the polling message carries information addressed to a specific aggregate group of the registered mobile platforms and includes a return channel which may be used by a mobile platform to communicate with the base transceiver. In one implementation, the control center protects the system from exceeding power spectral density (PSD) statistical limits by using the mobile platform in the group that has a greatest power spectral density signal as the PSD that the aggregate group will generate.

14 Claims, 3 Drawing Sheets

AGGREGATE BATCH POLLING METHOD FOR RETURN LINK COMMUNICATIONS BETWEEN A PLATFORM AND A BASE STATION

FIELD OF THE INVENTION

The present invention relates to systems and methods for facilitating communications and data content transfer between a base station and a mobile platform via a satellite-based transponder, or other like technology.

BACKGROUND

Broadband data and video services, on which our society and economy have grown to depend, have heretofore generally not been readily available to users on board mobile platforms such as aircraft, ships, trains, automobiles, etc. While the technology exists to deliver such services to all forms of mobile platforms, past solutions have been generally quite expensive, low data rate and/or available to only very limited markets of government/military users and some high-end maritime markets (i.e., cruise ships).

One particular problem with establishing communication links between numbers of mobile platforms operating within a given coverage region, and a single base station, for example a ground-based radio frequency (RF) transceiver, is the difficulty in quickly establishing communications links with each of the mobile platforms. For example, with commercial air traffic dozens of aircraft may be moving into and out of a given coverage region throughout any given time period. In this situation, it is critical that each aircraft be able to quickly establish a communications link with the base station within the coverage region which it is traversing without interfering with communication links already established with the base station by other aircraft.

U.S. Pat. No. 6,975,616 discloses a batch round robin polling method for return link communications between a mobile platform and a base station. The entire disclosure of U.S. Pat. No. 6,975,616 is hereby incorporated by reference. Mobile platforms may be "off-the-air" because they only operate a few days a month, like a business jet, or because they only elect to buy services for a few hours a week, like a maritime platform, or because they have landed to unload and load passengers, like a commercial airplane. Batch round robin polling may not efficiently handle the subset of mobile platforms that are intentionally not communicating with a base station. One common denominator for this subset of mobile platforms is any individual mobile platform's need for service is temporally independent of any other mobile platform's need for service. This situation typically results in a very low probability that any two will want to establish communication service through the same coverage area at the exact same time. Batch round robin polling continues to cyclically offer dedicated return communications channels to these mobile platforms even though they are unlikely to use one.

Cycling though all mobile platforms in the pooling pool in a reasonable time cycle, nominally five minutes, requires ground receiver assets and consumes return link power spectral density (PSD), the resource that limits the net data rate achievable through a return link transponder when using small aperture antennas, with little likelihood that a mobile platform will use the offered return communications channel. This is an inefficient use of ground receivers and return link capacity.

SUMMARY

Embodiments are described that use a control center to maintain a list of registered mobile platforms that are pre-authorized to make use of the satellite-based transponder to transmit and receive data content to and from the base transceiver. The control center may cause the base transceiver to transmit at least one polling message, the polling message carries information addressed to a specific aggregate group of the registered mobile platforms and includes a return channel which may be used by a mobile platform to communicate with the base transceiver. In one embodiment, the control center protects the system from exceeding power spectral density (PSD) statistical limits by using the mobile platform in the group that has a greatest power spectral density signal as the PSD that the aggregate group will generate. Both systems and methods are described that provide protections from a situation where PSD statistical limits are exceeded.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The features, functions, and advantages can be achieved independently in various embodiments of the present inventions or may be combined in yet other embodiments.

BRIEF DESCRIPTION OF THE DRAWINGS

The detailed description is described with reference to the accompanying figures.

DETAILED DESCRIPTION

The following description of exemplary implementations is merely exemplary in nature and is in no way intended to limit the invention, its application, or uses.

Figure 1:
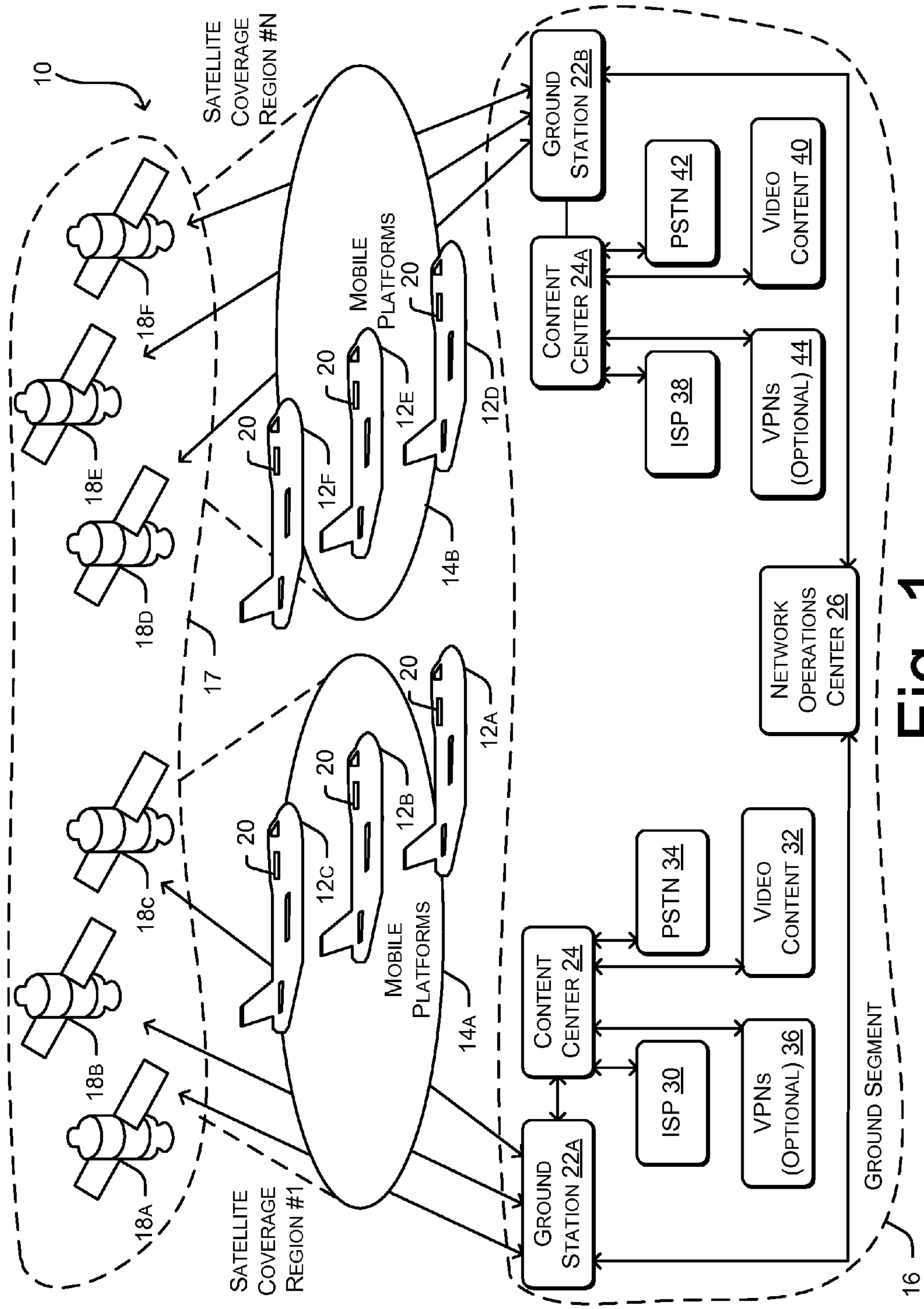
FIG. 1 illustrates a system in accordance with an exemplary implementation of the present invention. The system may be used to implement a polling method to provide dedicated return communications channels to a plurality of mobile platforms operating within one or more predefined coverage regions.

Referring to FIG. 1, there is shown a system 10 in accordance with an exemplary implementation of the present invention. The system 10 may be used to implement the polling method of the present invention to provide dedicated return communication channels to a plurality of mobile platforms operating within one or more predefined coverage regions 1 . . . N. FIG. 1 illustrates the moving platforms 12*a*-12*f* as aircraft, but it will be appreciated that cruise ships or any other moving vehicle could represent a mobile platform. As such, the illustration of the mobile platforms as aircraft in FIG. 1, and the reference to the mobile platforms 12 as aircraft throughout the following description, should not be construed as limiting the present invention to only aircraft.

The aircraft 12*a*-12*f* are also illustrated as operating within a pair of distinct coverage regions 14*a* and 14*b*. The system 10 generally includes a ground segment 16, a plurality of satellites 18*a*-18*f* forming a space segment 17, and a mobile system 20 disposed on each aircraft 12, or other similar moving platform. The mobile system 20 may include an RF transceiver, suitable transmit and receive antennas, and an antenna controller for enabling the antennas to be mechanically or electronically steered to track a designated satellite while the aircraft 12*a*-12*c* are traveling through the coverage region 14*a*.

The space segment 17 may include any number of satellites 18 in each coverage region 14*a* and 14*b* needed to provide coverage for the entire region. The satellites 18 may include Ku or Ka-band satellites, or satellites which communicate via any other suitable portion of the spectrum. Each of the satellites 18 are further located in a geostationary orbit (GSO) or a non-geostationary orbit (NGSO). Examples of possible NGSO orbits that could be used include low Earth orbit (LEO), medium Earth orbit (MEO) and a highly elliptical orbit (HEO). Each of the satellites 18 may include at least one radio frequency (RF) transponder, and more preferably a plurality of RF transponders. It will be appreciated that each satellite 18 may have as many RF transponders as required to handle the communications traffic anticipated from the aircraft 12 operating within the coverage areas 14*a* and 14*b*.

Ground station 22*a* may include an antenna and an RF transceiver with associated antenna control electronics needed for transmitting data content to the satellites 18. The antenna of the ground station 22*a* is also used to receive data content transponded by the transponders of each satellite 18 within the coverage region 14*a*. Ground station 22*a* may be located anywhere within the coverage region 14*a*. Similarly, ground station 22*b* can be located anywhere within the second coverage region 14*b*.

A content center 24 may be in communication with a variety of external content providers and controls the transmission of video and data information received by it to the ground station 22*a*. The content center 24 may be in contact with an Internet service provider (ISP) 30. Optionally, a video content source 32, a public switched telephone network (PSTN) 34, and/or one or more virtual private networks (VPNs) 36 may also be in contact with the content center 24. The ISP 30 may be used to provide Internet access to one or more occupants of the aircraft 12. The video content source 32 may be used to provide, for example, live television programming to the occupants of the aircraft 12.

A network operations center (NOC) 26 maintains databases of what return link channels are presently in use, as well as what return link channels are available for use by the aircraft 12. The NOC 26 also performs traditional network management, user authentication, customer service and billing tasks. The content center 24*a* associated with the ground station 22*b* in the second coverage region 14*b* may be in communication with an ISP 38, and optionally also with one or more of a video content provider 40, a PSTN 42 and a VPN 44. The coverage region N may operate in the same or similar manner as described in connection with coverage region 1. Therefore, for brevity, that discussion will not be repeated. Batch round robin polling may not efficiently handle the subset of mobile platforms that are intentionally not communicating with a base station.

Figure 2:
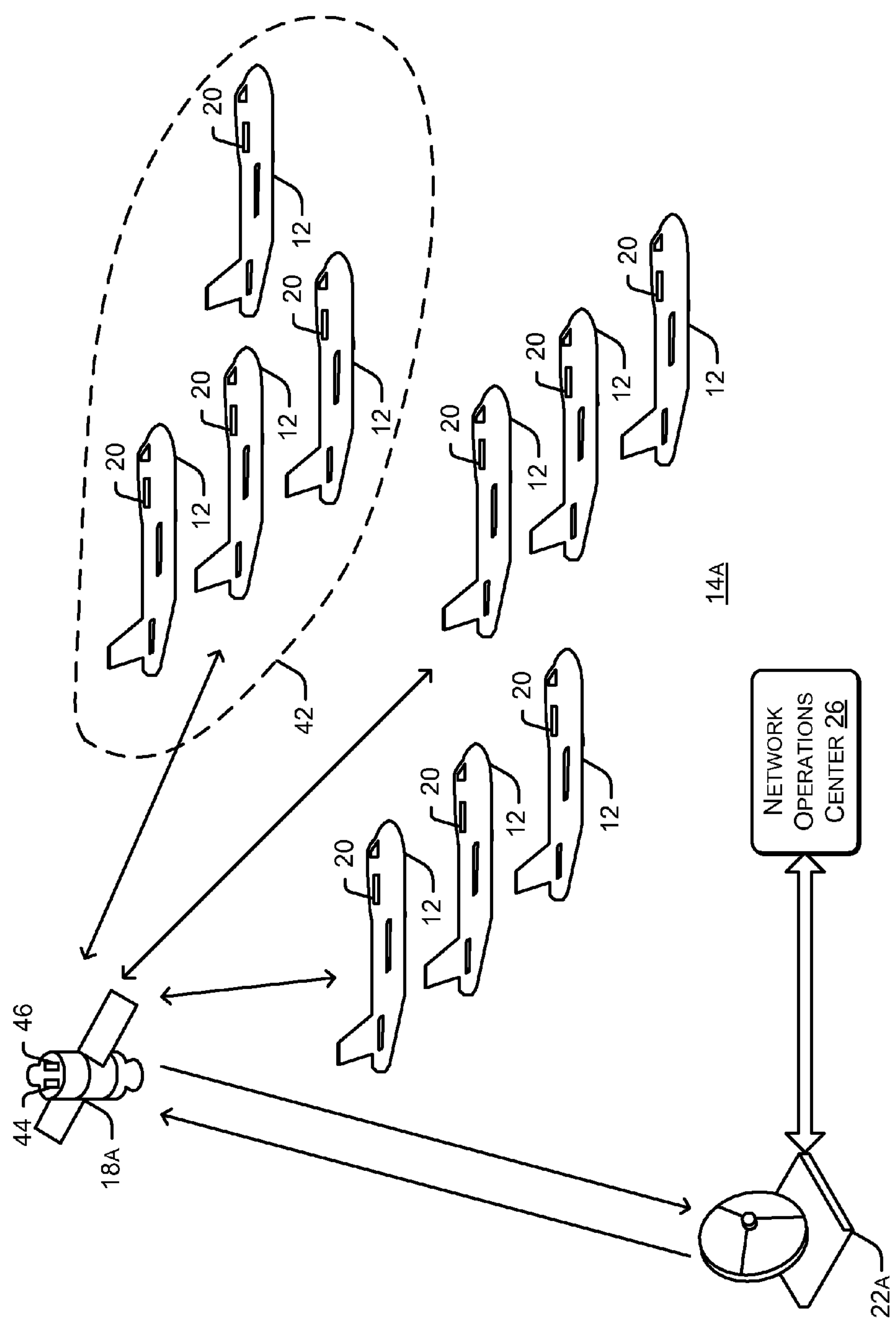
FIG. 2 illustrates a simplified illustrates a plurality of mobile platforms, in this instance aircraft, that may desire dedicated return communications channels. In accordance with one implementation, one or more of the aircraft may intentionally have no return communications channel.

Turning now to FIG. 2, the operation of the polling system of the present invention in establishing return communications links rapidly and in an orderly fashion with a plurality of aircraft operating within the coverage region 14*a* will be described. Here, at least one or more of the plurality of aircraft intentionally do not currently have return communications links with a ground station. As will be described later herein, a return communications link may be established with a ground station via a satellite return link transponder. Mobile platforms that intentionally do not have return communications links may be "off-the-air" because they only operate a few days a month, like a business jet, or because they only elect to buy services for a few hours a week, like a maritime platform, or because they have landed to unload or load passengers, like a commercial aircraft. Some or all of the aircraft illustrated in FIG. 2 are such aircraft.

Although this description will focus on only coverage region 14*a*, it will be appreciated that the system 10 and method of the present invention may be implemented in each distinct coverage region which the aircraft 12 is required to operate within. For simplicity, only satellite 18*a* has been illustrated as orbiting within the coverage region 14*a*. Also, some or all of the aircraft 12 can be considered as being within a single "batch" (i.e., group) for polling purposes.

The NOC 26 is provided with a list of "registered" users (i.e., aircraft 12) for which an account has been established. When an aircraft 12 is registered, some form of identification number (or other suitable identification information) associated with that particular aircraft is maintained by the NOC 26 in a polling database of authorized users (i.e., aircraft that have an account established with the NOC 26). The identification number may comprise an "ICAO" (International Communication Avionics Organization) number or any form of designation which uniquely identifies the aircraft 12. In addition, each aircraft 12 may be further designated as being "active," "inactive" or "intentionally inactive." An active aircraft is one that currently has a return communications link established with the ground station 22*a*. An inactive aircraft is one that is authorized to use the system 10 (i.e., its ID code is maintained in the NOC's 26 polling database) but which has not established a return communications link with the ground station 22*a* and likely desires to establish such a return communications link. An intentionally inactive aircraft is one that is also authorized to use the system 10 (i.e., its ID code is maintained in the NOC's 26 polling database) but which has not established a return communications link with the ground station 22*a* and may or may not desire to establish such a return communications link. Such intentionally inactive aircraft are delineated by reference number 42. These aircraft may be either airborne or ground borne.

An aircraft 12 which needs to be removed from service for temporary or extended maintenance may be reported to the NOC 26, by the airline operating that particular aircraft, that that aircraft has been temporarily removed from service. Such an aircraft can then be removed from the NOC's 26 polling database.

For purposes of simplicity, a single satellite 18*a* having a forward link transponder 44 and a return link transponder 46 is shown in FIG. 2. The term "forward link" is used to denote all transmissions of data content from the ground station 22*a* to the aircraft 12 via the forward link transponder 44. The term "return link" is used to denote all transmissions of data content from the aircraft 12 to the ground station 22*a* via the return link transponder 46. The return link transponder 46 is effectively subdivided into a plurality of narrow band "slots" or channels via code division multiple access (CDMA) multiplexing techniques, or alternatively via frequency division multiple access (FDMA), time division multiple access (TDMA) or other form(s) of multiple access techniques. Still further techniques are disclosed in U.S. Pat. No. 5,103,459 to Gilhousen et al., which is hereby incorporated by reference into the present application. Each narrowband channel comprises a predetermined bandwidth and data rate, for example, 13.5 MHz and 16 Kbps. However, it will be appreciated that a larger or smaller bandwidth channel could be incorporated and larger or smaller data rates.

Figure 3:
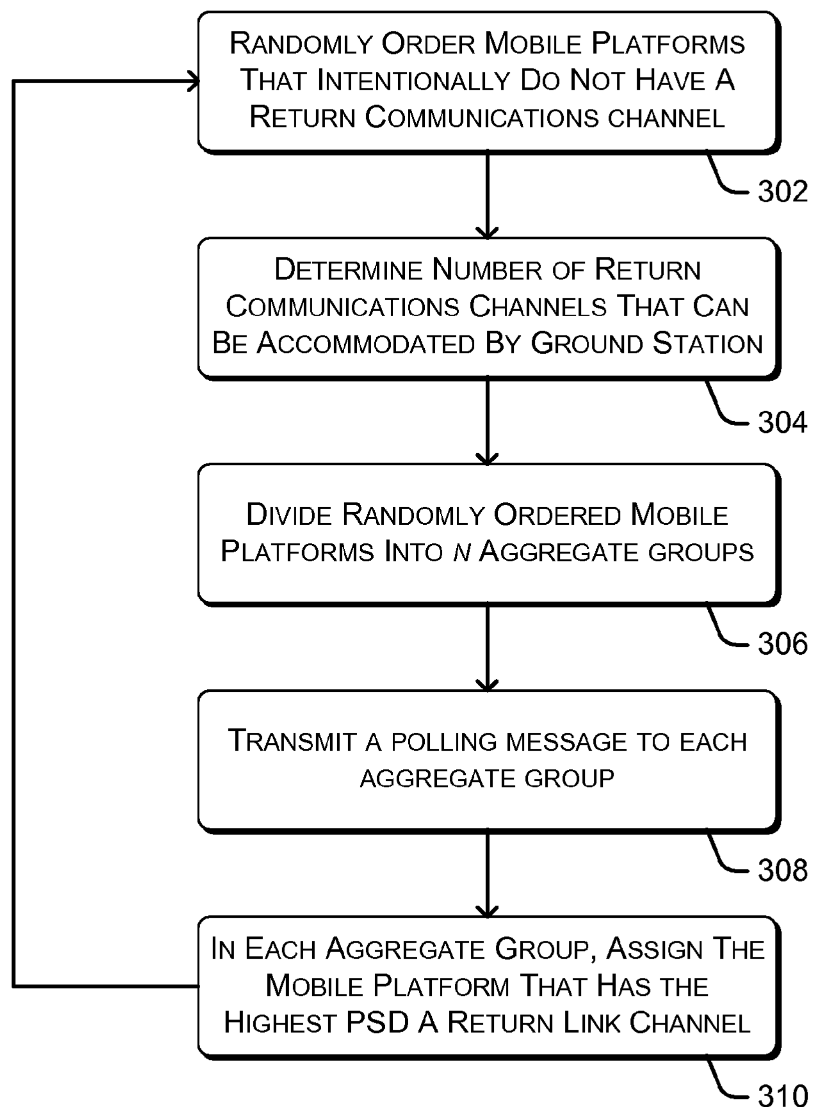
FIG. 3 illustrates a flow diagram of a process for assigning return communications links to mobile platforms (e.g., aircraft 12) that do not currently have active links.

Referring now to FIGS. 2 and 3, the polling system and method in accordance with an embodiment of the present invention will be described. In one implementation, multicast forward link polling messages are transmitted from the ground station 22*a* via the forward link transponder 18*a* to a group, or aggregate batch, of the intentionally inactive users 42 in the NOC's 26 user polling database. A polling batch may include a number of aircraft larger or smaller than the number shown in FIG. 2, depending on available transponder resources (e.g. available return channels). In the present example, the single aggregate batch of intentionally inactive aircraft 42 shown in FIG. 2 includes two aircraft taken from the intentionally inactive aircraft 42. The two aircraft may be any two of the inactive aircraft shown by the dashed-line region 42 illustrated in FIG. 2.

In one implementation, the multicast polling messages each carry several items of information, namely, the ID code of the aircraft for which the message is intended, information as to which satellite should be tracked, the frequency band of a return link transponder assigned to the aircraft, the data rate to be used, and the CDMA or other form of multiple access code to be used by the mobile system 20 of the aircraft for communications with the ground station 22*a*. The specific satellite, return link transponder, transponder frequency band, data rate and CDMA code (or other form of multiple access code) can collectively be viewed as a return communications channel.

FIG. 3 illustrates a flow diagram of a process 300 for assigning return communications channels to mobile platforms (e.g., aircraft 12) that do not currently have active links. In particular, the flow diagram illustrates a process for assigning return communications channels to mobile platforms (aircraft group 42) that intentionally do not have return communications channels. At block 302, those mobile platforms that intentionally do not have a return communications channel are arranged in a randomly ordered list. The NOC 26 may produce and maintain this randomly ordered list of mobile platforms that intentionally do not have return communications channels. Therefore, if the aircraft 12 of FIG. 2 are considered, the intentionally inactive aircraft 42 would be randomly ordered.

At block 304, the NOC 26 determines how many new return communications channels the ground station can accommodate. The ground station contains receiver channels that receive the return link communication channel from the mobile platforms through a transponder. A subset of these receiver channels are actively being used to receive signals from mobile platforms with return link communication channels and the remaining receiver channels are available for establishing new return link communications channels. In one implementation, the NOC 26 maintains a real time receiver channel utilization list that includes a list of those receiver channels and associated return link transponders that are presently available at a given time. This list may be updated by periodic polling of the receiver channels and satellites designed to provide communications bandwidth to mobile platforms.

At block 306, considering each receiver channel that is available for establishing a new return communication channel, the randomly ordered list of mobile platforms of block 302 is divided into n aggregate groups where n is the number of available receiver channels determined at block 304. For example, if the NOC 26 determines there are a total of two (2) receiver channels currently unused and there are four intentionally inactive mobile platforms 42, then two (n=2) aggregate groups would be created at block 306. Each aggregate group would include two (2) mobile platforms, and each group is assigned one (1) receiver channel and one (1) return communications channel. The foregoing example is merely exemplary.

At block 308, each of the aggregate groups determined at block 306 is sent a batch round robin poll message (i.e., a multicast polling message). Polling and establishing a return link is discussed in further detail in U.S. Pat. No. 6,975,616. However, unlike the indicated patent, the mobile platforms' power spectral density (PSD) level are used to determine which mobile platform's PSD is book-kept for a given aggregate group. In one implementation, the mobile platform that has the highest PSD in each aggregate group is used as the worst case PSD that may result from a mobile platform establishing a return link channel of those mobile platforms in the polling message of block 308 (block 310).

Mobile platform antennas tend to be smaller in aperture size than conventional terrestrial Very Small Aperture (VSAT) antennas. As a result, they radiate more power to adjacent satellites along the geostationary orbit (GSO) plane and into non-geostationary orbit (NGSO) space. There are statistical regulatory requirements imposed by regulatory agencies such as the Federal Communications Commission (FCC) and International Telecommunications Union (ITU) on the maximum PSD that can be radiated into the GSO and NGSO spaces on a transponder by transponder basis. The PSD for a single mobile platform is used for aggregate polling because the statistical probability that more than one will try to establish a return link on the same poll message is negligible relative to the overall regulatory statistical requirements. If the statistics of a given deployed system do not meet this criteria so two or more mobile platforms transmitting at the same time is statistically significant then more than a single mobile platform's PSD level must be used for the aggregate being polled. A fleet of mobile platforms may contain a variety of different antennas each of which may generate a different PSD interference level so there is a need to decide what PSD level to use to represent the possible mobile platform that may claim a return link. Using the highest PSD level of any of the antenna types ensures this level will not be exceeded when any mobile platform establishes a return link.

The NOC 26 may be used to determine the PSD of any given mobile platform. Determination of PSD of a given mobile platform may be accomplished using the "reverse calculation" method, as is described in U.S. Patent Application Publications 20020058477 and 20020058478, which applications are hereby incorporated by reference.

Following the acts performed at block 310, the NOC 26 may adjust the number of mobile platforms that intentionally do not have a return link upon completion of the batch poll. That is, the NOC 26 removes those aircraft that have established return link channels from NOC's intentionally inactive user polling database/list. Those aircraft that did not establish a return link channel are maintained in the NOC's 26 intentionally inactive user polling database. The process illustrated in FIG. 3 may then be repeated.

In one implementation, using the process 300 illustrated in FIG. 3, all the mobile platforms that intentionally do not have return link communications are polled in each poll batch, with the norm being that one mobile platform of an aggregate batch will occasionally claim a return link of a given receiver. However, because an aggregate group of mobile platforms is assigned to the same return link channel, it is possible a communications related collision may occur between two or more mobile platforms trying to claim the same return link channel concurrently. This collision may result in none of the mobile platforms being successful in establishing a return link on that poll cycle. When two or more receiver channels are made available for establishing a given return link channel, then randomly ordering the mobile platform list at block 302 causes statistical scattering of assignment of the mobile platforms to the available return link channels. Thus, eventually, the original colliding mobile platforms will be assigned to different return link channels, and thereby receiver channels, and they can successfully establish a return link. The lower the ratio of mobile platforms to the available receivers, the higher the probability that a second collision will occur. If this ratio is one then there is a return link channel available for every mobile platform that needs to be polled, so there should never be a collision. If there is only one receiver channel then the probability of a collision can be reduced only by dividing the randomly ordered list of mobile platforms of block 302 into n aggregate groups where n times the poll cycle duration equals the desired time to cycle through all platforms to be polled. The aggregate groups are then sequentially sent in batch round robin poll messages until all groups have been polled. This distributes the aggregate groups in time rather than by available receivers. When there is more than one available receiver channel then a combination of dividing the randomly ordered list of platforms between available receivers and sequential poll messages can be used to control the probability of a collision to a desired value.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method to assign communication channels between one or more mobile platforms and a ground station in a communication system which comprises at least one satellite-based transponder, the method comprising:

generating a randomly ordered list of mobile platforms which do not have a return communication channel to the ground station;

determining a number, n, of available communication channels at the ground station;

assigning the mobile platforms into the corresponding number, n, of aggregate groups;

wherein determining, for each aggregate group, a worst-case power spectral density (PSD) measure comprises: transmitting a poll message to the aggregate groups; receiving a response from the mobile platforms in the aggregate groups; determining a PSD measure for each mobile platform in the aggregate groups; selecting the highest PSD measure associated with a mobile platform in a given aggregate group as the worst case PSD measure for the aggregate group; and assigning a return communication channel to the plurality of mobile platforms in an aggregate group when the worst-case PSD measure is beneath a threshold.

2. The method of claim 1, further comprising removing the plurality of mobile platforms which were assigned a return communication channel from the randomly ordered list of mobile platforms.

3. The method of claim 1, further comprising denying a return communication channel to the plurality of mobile platforms in an aggregate group when worst-case PSD measure is above a threshold.

4. The method of claim 3, wherein the plurality of mobile platforms which are denied a communication channel are kept on the randomly ordered list of mobile platforms which do not have a return communication channel to the ground station.

5. The method of claim 1, wherein determining a number, n, of available communication channels at the ground station comprises maintaining, in a network operations center (NOC) a real-time receiver channel utilization list of available receiver channels.

6. The method of claim 1, wherein the poll message comprises at least one aircraft identification code, information concerning which one of a plurality of satellites the mobile platform has been assigned to track, a frequency band of a specific transponder for establishing a return communications link, a data rate, and a multiple access code.

7. The method of claim 1, wherein the return communication channel comprises a predetermined bandwidth and data rate, and wherein a control center maintains a list of return channels in use at all times.

8. A system to assign communication channels between one or more mobile platforms and a ground station in a communication system which comprises at least one satellite-based transponder, the system comprising a network operations center to:

generate a randomly ordered list of mobile platforms which do not have a return communication channel to the ground station;

determine a number, n, of available communication channels at the ground station;

assign the mobile platforms into the corresponding number, n, of aggregate groups;

determine, for each aggregate group, a worst-case power spectral density (PSD) measure, wherein the network operations center further: transmits a poll message to the aggregate groups; receives a response from the mobile platforms in the aggregate groups; determines a PSD measure for each mobile platform in the aggregate groups; selects the highest PSD measure associated with a mobile platform in a given aggregate group as the worst case PSD measure for the aggregate group; and assign a return communication channel to the plurality of mobile platforms in an aggregate group when the worst-case PSD measure is beneath a threshold.

9. The system of claim 8, wherein the network operations center further removes the plurality of mobile platforms which were assigned a return communication channel from the randomly ordered list of mobile platforms.

10. The system of claim 8, wherein the network operations center further denies a return communication channel to the plurality of mobile platforms in an aggregate group when worst-case PSD measure is above a threshold.

11. The system of claim 10, wherein the plurality of mobile platforms which are denied a communication channel are kept on the randomly ordered list of mobile platforms which do not have a return communication channel to the ground station.

12. The system of claim 8, wherein the network operations center further maintains, in a network operations center (NOC) a real-time receiver channel utilization list of available receiver channels.

13. The system of claim 8, wherein the poll message comprises at least one aircraft identification code, information concerning which one of a plurality of satellites the mobile platform has been assigned to track, a frequency band of a specific transponder for establishing a return communications link, a data rate, and a multiple access code.

14. The system of claim 8, wherein the return communication channel comprises a predetermined bandwidth and data rate, and wherein a control center maintains a list of return channels in use at all times.

* * * * *